United States Patent
Busch et al.

(10) Patent No.: US 10,046,189 B2
(45) Date of Patent: Aug. 14, 2018

(54) NETWORK CONTROLLABLE PRESSURE GOVERNOR

(71) Applicant: Akron Brass Company, Wooster, OH (US)

(72) Inventors: Bradley L. Busch, Ocala, FL (US); William M. Branch, Ocala, FL (US)

(73) Assignee: Akron Brass Company, Wooster, OH (US)

( * ) Notice: Subject to any disclaimer, the term of this patent is extended or adjusted under 35 U.S.C. 154(b) by 240 days.

(21) Appl. No.: 14/877,276

(22) Filed: Oct. 7, 2015

(65) Prior Publication Data

US 2016/0096054 A1    Apr. 7, 2016

Related U.S. Application Data

(60) Provisional application No. 62/060,829, filed on Oct. 7, 2014.

(51) Int. Cl.
| | |
|---|---|
| *G05D 7/00* | (2006.01) |
| *A62C 37/00* | (2006.01) |
| *H04L 29/08* | (2006.01) |
| *G05D 16/20* | (2006.01) |
| *G05B 15/02* | (2006.01) |

(52) U.S. Cl.
CPC ............. *A62C 37/00* (2013.01); *G05B 15/02* (2013.01); *G05D 16/2066* (2013.01); *H04L 67/12* (2013.01); *H04L 67/125* (2013.01)

(58) Field of Classification Search
CPC .......................................... A62C 37/00–37/50

USPC .................................................. 700/275–306
See application file for complete search history.

(56) References Cited

U.S. PATENT DOCUMENTS

| | | | |
|---|---|---|---|
| 1,725,273 | A | 8/1929 | Hollander et al. |
| 2,079,781 | A | 5/1937 | Walker |
| 2,420,515 | A | 5/1947 | Barton |
| 2,634,681 | A | 4/1953 | Rowell |
| 2,642,805 | A | 6/1953 | Nepper |
| 2,691,941 | A | 10/1954 | Barklow |
| 2,820,414 | A | 1/1958 | Fejedelem |
| 2,896,541 | A | 7/1959 | Barton |
| 3,116,694 | A | 1/1964 | Eberhardt |

(Continued)

OTHER PUBLICATIONS

Qi, Yang. "A study on the reliability of fire water supply system in high-rise buildings." Fire technology 38.1 (2002): pp. 71-79. (Year: 2002).*

(Continued)

*Primary Examiner* — Satish Rampuria
(74) *Attorney, Agent, or Firm* — Tucker Ellis LLP; Michael Craig; Heather Barnes (57) ABSTRACT

One or more techniques and/or systems are disclosed for a fire apparatus pump pressure governor. The system may comprise a controller that is configured to receive from, and provide instruction or data to, other control devices to facilitate in controlling of the pressure of a fire apparatus pump and fluid supply, both to and from the pump. A method may be devised to facilitate in controlling the pump operations, and to report a status of the pump to other controllers within a network locally, communicatively coupled with the governor, along with other networks or devices that are remotely communicatively coupled with the fire apparatus.

17 Claims, 4 Drawing Sheets

(56) References Cited

U.S. PATENT DOCUMENTS

| | | | |
|---|---|---|---|
| 3,567,338 A | 3/1971 | Edwards | |
| 3,756,747 A | 9/1973 | Caffrey | |
| 3,997,282 A | 12/1976 | Thomas et al. | |
| 4,492,525 A | 1/1985 | Bilyeu | |
| 4,553,902 A | 11/1985 | Eberhardt | |
| 5,888,051 A | 3/1999 | McLoughlin et al. | |
| 5,967,757 A | 10/1999 | Gunn et al. | |
| 6,085,586 A | 7/2000 | Arvidson et al. | |
| 6,547,528 B1 | 4/2003 | Yoshida | |
| 6,551,073 B1 | 4/2003 | O'Sullivan | |
| 7,040,868 B2 | 5/2006 | McLaughlin et al. | |
| 7,234,922 B2 | 6/2007 | Kunkler et al. | |
| 7,255,539 B1 | 8/2007 | Kunkler et al. | |
| 7,635,253 B2 | 12/2009 | Garcia-Ortiz | |
| 7,987,916 B2 | 8/2011 | Laskaris et al. | |
| 8,162,619 B2 | 4/2012 | Laskaris | |
| 8,332,079 B2 | 12/2012 | Kindt et al. | |
| 8,517,696 B2 | 8/2013 | McLoughlin et al. | |
| 8,641,385 B2 | 2/2014 | Koehl | |
| 8,801,393 B2 | 8/2014 | Crabtree et al. | |
| 8,839,876 B2 | 9/2014 | McLoughlin et al. | |
| 2003/0210984 A1 | 11/2003 | Whitney | |
| 2004/0247448 A1 | 12/2004 | Kunkler et al. | |
| 2006/0235573 A1* | 10/2006 | Guion | F04B 47/06 700/282 |
| 2007/0221388 A1* | 9/2007 | Johnson | A62C 35/58 169/16 |
| 2007/0286736 A1 | 12/2007 | Grady et al. | |
| 2008/0292472 A1 | 11/2008 | Laskaris | |
| 2009/0208346 A1 | 8/2009 | McLoughlin et al. | |
| 2009/0315726 A1 | 12/2009 | Popp et al. | |
| 2010/0183447 A1 | 7/2010 | Moskun et al. | |
| 2011/0200461 A1 | 8/2011 | Christensen et al. | |
| 2011/0308823 A1 | 12/2011 | Seebaluck et al. | |
| 2013/0186653 A1* | 7/2013 | Cerrano | A62C 37/00 169/46 |
| 2013/0253711 A1* | 9/2013 | McLoughlin | F04B 17/05 700/282 |
| 2016/0096053 A1* | 4/2016 | Beechy | A62C 35/68 169/46 |

OTHER PUBLICATIONS

Davis, Simon. "Fire Fighting Water: A Review of Fire Fighting Water Requirements a New Zealand Perspective." (2000). pp. 1-100 (Year: 2000).*

PCT International Search Report and Written Opinion from International Application No. PCT/US2015/054448, dated Dec. 29, 2015, 16 pages.

* cited by examiner

NETWORK CONTROLLABLE PRESSURE GOVERNOR

CROSS-REFERENCE TO RELATED APPLICATIONS

This application claims priority to U.S. Provisional Patent Application Ser. No. 62/060,829, entitled NETWORK CONTROLLABLE FIRE APPARATUS PUMP PRESSURE GOVERNOR, filed Oct. 7, 2014, which is incorporated herein by reference.

BACKGROUND

Devices and systems are available that can be used to regulate the pressure of a pump mounted to a fire apparatus, such as a fire truck. Currently, pressure governors are often self-contained controllers with an integral user interface, which can be mounted on a fire truck pump control station. As an example, a pressure governor controller can be mounted to a fire truck operator's pump panel. Functionally, a pressure governor controller may allow a user to control the speed of an engine that is coupled to the fire pump. Controlling the engine speed may result in a control of, or change in, pump pressure. Often, pressure governors are used to maintain a desired pump pressure, which can be dictated by an onsite user (e.g., fire fighter). Such a pressure governor can monitor the pressure of the pump and modulate the engine speed, thereby affecting the impeller speed of the pump, and therefore the discharge pressure of the pump.

Traditionally control devices located at a fire apparatus control station have been specific to a task. As an example, tasks may include a control device for a valve, a control device to activate a pump, a priming device or a throttle control means to affect a change in pump pressure. As another example, a self-contained fire pressure governor control may utilize an integral user interface disposed at other locations, including, a base of an aerial ladder turntable station, an aerial ladder platform located at the end of ladder, and/or a control station within the cabin of the fire truck.

Electronically controlled fire pump pressure governors can be found on modern fire apparatus. Traditionally, the controller exists as an independent device on a control panel with an integral user operator panel intended to be operated by those persons tasked with controlling the firefighting apparatus to attain a desired discharge pressure of the fire pump.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, a fire apparatus pump pressure governor as described. In one implementation, the system can comprise a controller that is configured to receive data from, and provide instruction to, other devices (e.g., control devices). For example, data or commands may be used to facilitate in controlling of the pressure of a fire apparatus pump and water supply, both to and from the pump. In one implementation, a method may be devised to facilitate in controlling the pump operations and to report a status of the pump to other controllers within a network locally, communicatively coupled with the governor, along with other networks or devices that are remotely communicatively coupled with the fire apparatus.

In one implementation, an example system can comprise a pump pressure control device that is configured to take action to modulate the fire apparatus pump pressure based on one or more parameters that may be received from one or more control devices, those devices being related to (e.g., but non-specific to) user input at a fire apparatus pump control location. In one implementation, the example system may comprise a pump pressure controller that is not structurally mounted to the primary fire apparatus control station.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

Figure 1:
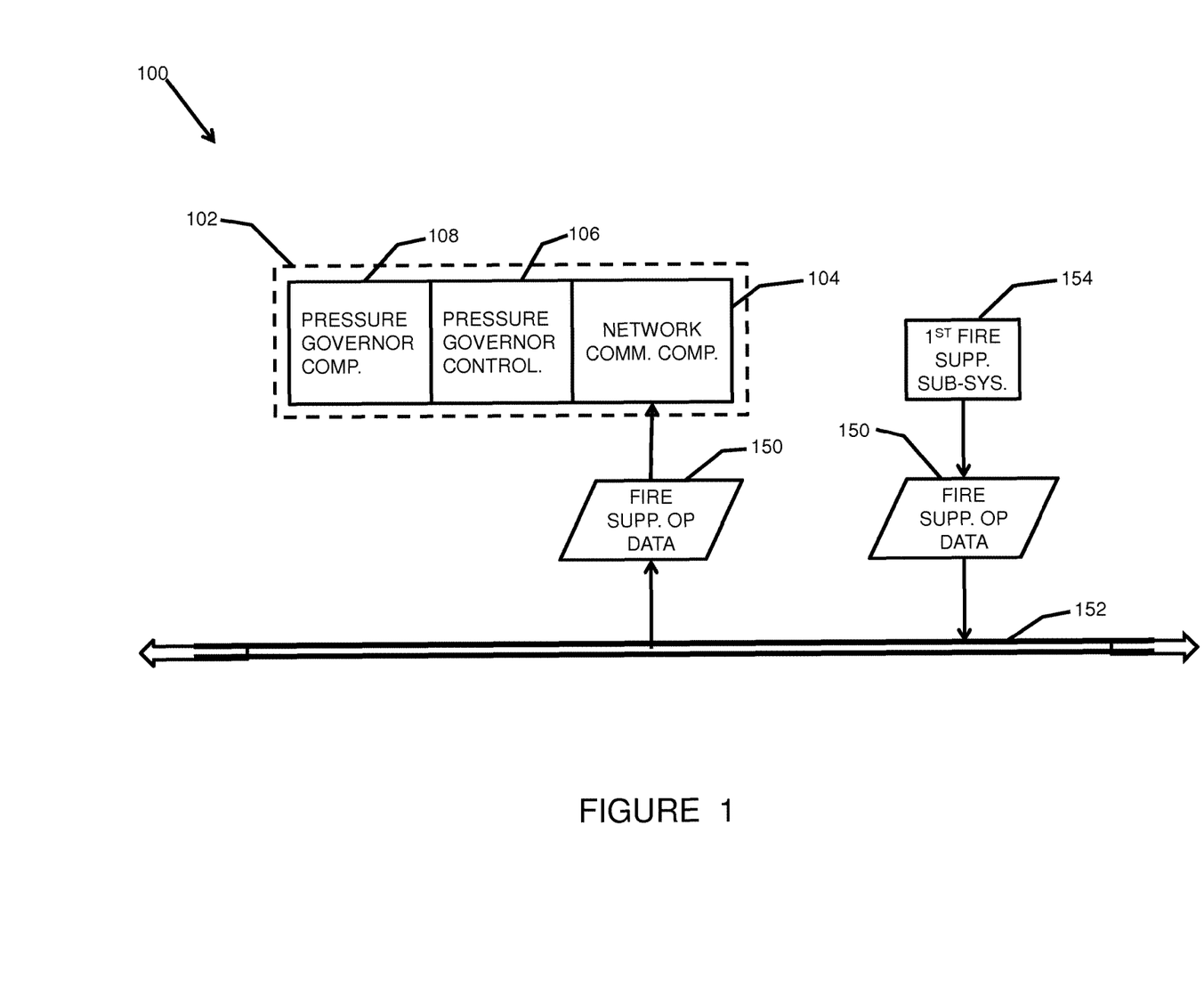
FIG. 1 is a schematic diagram illustrating an exemplary implementation of a system for controlling fluid pressure in a fire suppression system.

FIG. 1 is a component diagram illustrating one implementation of one or more portions of an exemplary fire suppression system 100 where fluid pressure can be controlled. In this implementation 100, the exemplary controller system 102 can comprise a network communication component 104 that can be configured to communicatively couple with a fire suppression communication network 152. The network 152 can be configured to communicate fire suppression operation data 150 to the controller system 102 from at least a first fire suppression sub-system 154 that is communicatively coupled with the network 152. Further, the network communication component 104 can be configured to receive the fire suppression operation data 150.

The exemplary controller system 102 can also comprise a pressure governor controller 106, which can be operably coupled with the network communication component 104. The pressure governor controller 106 can be configured to modify an operation of a pressure governor component 108 based at least upon the fire suppression operation data 150. Additionally, in this implementation, the exemplary controller system 102 can comprise the pressure governor component 108, which can be operably coupled with the pressure governor controller 106. The pressure governor component 108 can be configured to control a fluid flow output of a fluid pump that is coupled with the fire suppression system 100 by controlling a power output of an engine coupled with the fluid pump.

Figure 2:
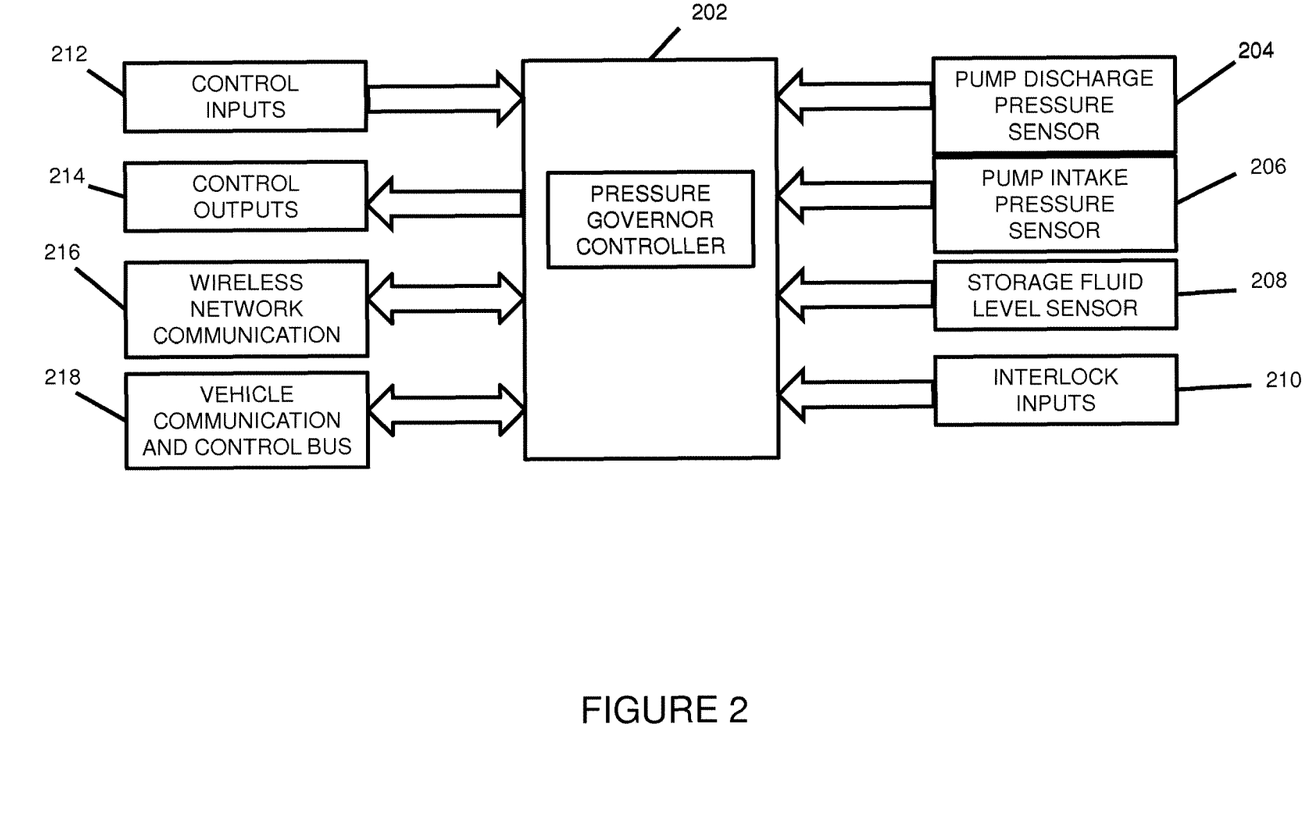
FIG. 2 is a schematic diagram illustrating one implementation of one or more portions of one or more systems described herein.

FIG. 2 is a schematic diagram illustrated in block view, comprising an example implementation of a pressure governor control, as described herein. In one implementation, governor control module 202 can be communicatively coupled with a fire suppression operation communication network using wireless network communication 216, and/or a wired network communication 218, such as over a vehicle communication and control bus. Further, the governor control module 202 can be configured to monitor a pump fluid pressure of a fire pump utilizing a discharge fluid pressure sensor 204 and/or a pump intake fluid pressure sensor 206. In one implementation, the governor control 202 can be configured to monitor a level of fluid in a water storage source, such as by using a communicatively coupled source level sensor 208. In one implementation, the pump pressure governor can be configured to utilize the data provided by sensors 204, 206 and 206 in an algorithm used to identify control operations, for example, altering a speed of an associated engine, which may thereby alter a pump speed and a fluid pressure in the system.

Operation of a pump pressure governor can be affected by an interlock that may be disposed on one or more portions of one or more components coupled with the system. A number of these types of interlocks are defined by the National Fire Protection Association (NFPA) 1901 standards (NFPA-1901), "Standard for Automotive Fire Apparatus." NFPA 1901 interlock describes interlock requirements for a variety of circumstances, which may change depending on a configuration of the pump drive engine and transmission. In one implementation, the controller 202 can be configured to monitor one or more system safety interlocks inputs 210, for example, using a wired connection 218 (e.g., or wireless 216) to the controller 202. In another implementation, the pressure governor controller 202 can be configured to receive an interlock status 210 of another device communicatively coupled with the system, or may identify the interlock status 210 using the device's data parameters, such as received over a vehicle communication and control bus interface 218.

As an example, a pump engagement indicator (e.g., indicating whether a pump is operating) can be communicatively coupled (e.g., wired) with a dash mounted instrument cluster, and used to illuminate a "pump engaged" light, such as when the pump is operating. For example, a typical instrument cluster may be connected to a vehicle drivetrain communication bus, which can transmit that data parameter to the pump engagement indicator. In this example, an interlock circuit can be operably connected (e.g., hardwired) to the controller 202, such as through a wire interlock input 210. In one implementation, using the systems described herein, a pump pressure controller 202 can be configured to automatically detect the interlock state of the one or more coupled devices/systems (e.g., through the network), which may mitigate a number of wired connections needed to accomplish this task. In this way, for example, a reliability of the system may be increased, and maintenance of the controller installation may be reduced. In one implementation, an interlock state input 210 can be provided to the pressure controller 202 by broadcasting the state onto an apparatus drivetrain control and communication bus 218 (e.g., CAN). In one implementation, the bus can comprise an SAE-J1939 bus.

In one aspect, the interlock requirements specified by the NFPA-1901 standard resulted from migration of engine throttle control from mechanical means to electronic means. The required interlocks can be very specific and are designed to prevent advancement of the engine speed in the event that the fire pump engagement was not completely made. That is, for example, in some systems, a transfer case may connect the output shaft of the transmission to the pump, and away from the rear driven driveline. In this example, when a pump shift event did not transfer the power output to the pump, completely, the driveline could potentially still transfer energy from the driveline to the truck transfer case, and the truck could move, if needed.

In this aspect, advent of electronic throttle control and transmission functions allowed for the example situation to be detected. However, the NFPA standards may not account for input from the vehicle ABS (anti-lock braking system) controller (e.g., or some other vehicle components). In one implementation, the pressure governor controller 202 may be configured to monitor a movement of the fire apparatus wheels using a network device (e.g., the ABS controller), for example, to detect undesired movement of the vehicle and to take action accordingly to reduce the engine speed to an idle position. In this implementation, for example, the controller can comprise a mechanism that provides for improved control of fire system component (e.g., more than those provided for in the NFPA standards).

In one aspect, respective fire apparatus pumps can be fluidly coupled to one or more valves that can be controlled independently by an operator. In this aspect, the valves can be coupled to discharge points, for example, and directed to place a water-based solution onto a fire. As an example, the water solution may comprise water, or water mixed with a fire suppression agent. In one example, the agent can comprise a liquid firefighting foam constituent, or a liquid foam constituent including a compressed air component. Further, in one aspect, current fire apparatus pressure controllers allow for operators to adjust and maintain a pump pressure for the systems. In this aspect, the controllers are typically specific to the task of increasing or decreasing the pump pressure, based upon the operator's physical input to the controller mounted at the location of a control station.

In one implementation, a controller may be devised that may not be specifically related to a fire apparatus control station, but rather to a network of devices that can provide information applicable to, and affecting, a desired pressure of the fire pump, based at least on user input and/or other input from devices coupled with the network. In one implementation, a pump pressure control node can accept commands, in the form of input data, from one or more sources. As an example, the one or more sources may comprise various forms of user input, and various forms of device inputs. In one implementation, user inputs can be received from the vehicle communication bus 218 or through discrete coupled inputs 212. In this way, for example, the disclosed governor control 202 may provide a plurality of methods for command inputs for quickly and easily adapting to the situational requirements specific to a control location.

In one implementation, the governor controller 202 can be configured to control the speed of the pump drive engine. As an illustrative example, engine speed can correlate directly to pump speed, as the pump drive can be coupled to the pump drive engine through a transmission. In one implementation, control of the engine can be communicated by the controller 202 to the engine through a vehicle communication bus 218. In another implementation, the controller 202 can relay commands concerning engine speed to appropriate components using discrete control connections 214 (e.g., wired).

Figure 3:
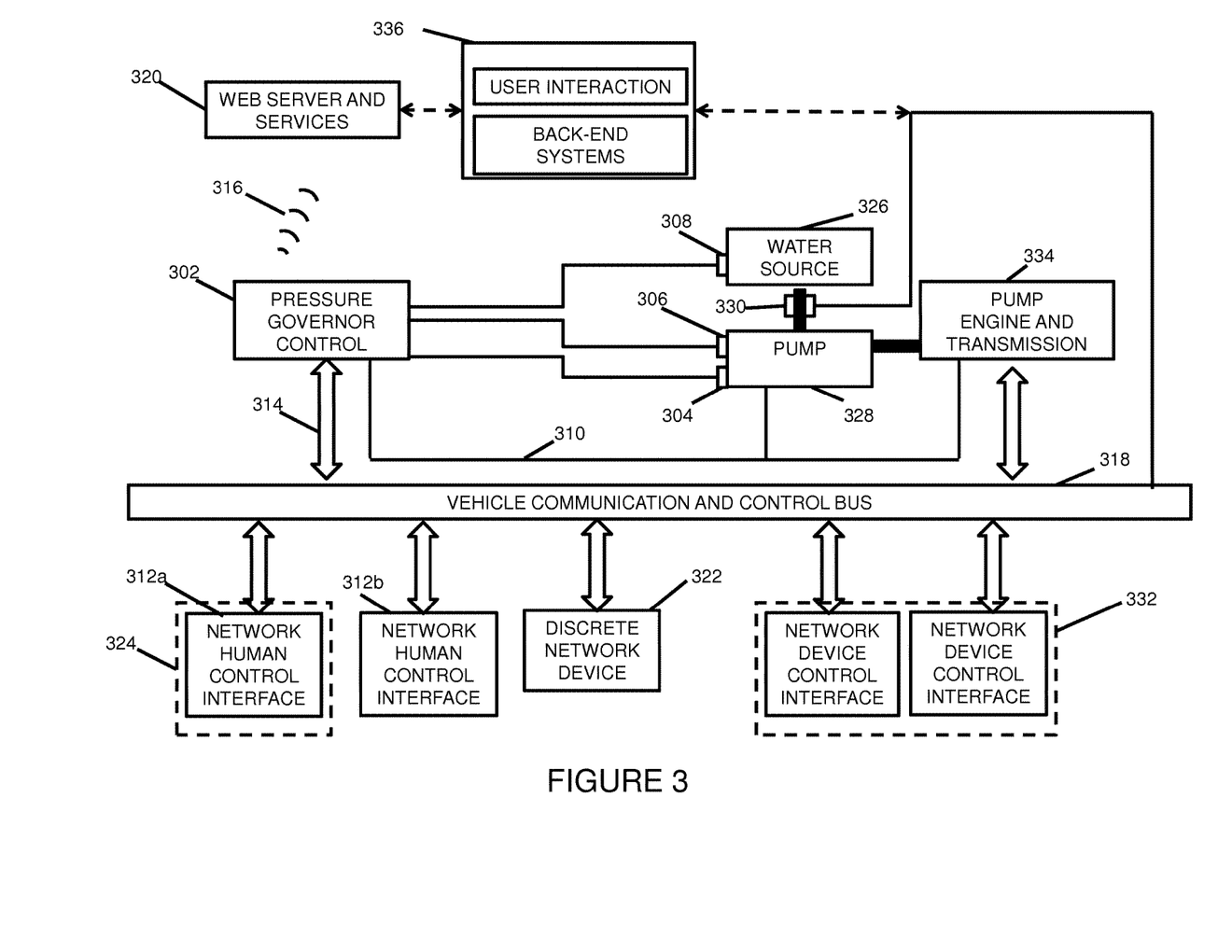
FIG. 3 is a schematic diagram illustrating one implementation of one or more portions of one or more systems described herein.

FIG. 3 is a schematic diagram illustrating an example implementation 300 of one or more systems described herein. In one implementation, the pressure governor control 302 can be configured to accept control commands from a first control station 312a. In one aspect, the NFPA-1901 standard calls for a pump pressure control to be disposed at a fire apparatus pump operator's panel 324. According to the NFPA-1901 Standard, the fire apparatus pump operator's panel 324 can comprise an area on a fire apparatus that contains gauges, controls, and other instruments used for operating the pump. Further, in this aspect, according to the NFPA-1901 Standard, means to control engine speed, and pump pressure, must be provided at the pump operator's panel 324 of a fire truck. In one implementation, in this aspect, the "means to control engine speed" may be accomplished using a rotary Vernier throttle control that can be coupled with a connector (e.g., cable) leading to an engine throttle (e.g., lever). In another implementation, in this aspect, the "means to control engine speed" may be accomplished using electronic means, such as by utilizing a control module communicatively coupled to the engine control module. In another implementation, the pressure governor can be configured to accept a command from one or more control stations, for example, a human control interface 312a, 312b based control station.

In one aspect, a plurality of pressure governors may be disposed in the fire apparatus/system, for example, with integral user interfaces placed at respective locations. Having a plurality of pressure governors can add both cost and complexity to the apparatus, as well as a duplication of data and instruments. As an example, the fire apparatus may comprise an aerial ladder. In this example, the fire apparatus may also comprise a secondary pump pressure control device (e.g., a secondary pressure governor). In another example, the fire apparatus may comprise a front mounted discharge turret or waterway. In this example, the fire apparatus may also comprise another pump pressure control system (e.g., a third pressure governor), such as located in the cabin of the truck. For example, each of these control stations may have various operating characteristics that may be particular to the location and the devices that it controls.

As an illustrative example, a cab control portion of a controller may merely utilize an engine speed increase and decrease switch for its particular operation, while a pump panel mounted controller device may utilize increase, decrease, mode and idle functions. As another example, an aerial platform may comprise an existing third party control system, along with limited control space. In this example, one or more commands relating to engine and or pump speed may be incorporated into an existing control or other network system.

In one aspect, a pump pressure governor controller 302 can be configured to support two or more network device control interfaces 332, comprising station controls, configured to provide control inputs to the pressure governor controller 302. In one implementation, by operating in a master-slave configuration, two network device control interfaces (e.g., 332) can be installed at different locations in a fire suppression system (e.g., 300), and a method to transfer control to one or the other can be implemented. As one example, the pump pressure governor controller 302 may use a transfer switch, which can communicatively couple either one of the two or more network device control interfaces 332 to an engine 334. As another example, two or more network device control interfaces 332 may be coupled in a master-slave configuration, where a slave governor controller communicates data to a master governor controller. In this aspect, a dedicated pump network device control interface 332 can be disposed at respective station controls, to help control pump or engine speed.

In another aspect, merely one remotely mounted control unit (e.g., 302) may be operably coupled with the engine control module of the pump driving engine 334. In this aspect, the remotely mounted control unit 302 can be configured to accept a control message from a one or more devices (e.g., 332, 322, 312), for example, or other control networks, where the remotely mounted control unit 302 can be configured to be agnostic to its location or configuration.

In one implementation, a pressure governor system can be configured to wirelessly 316 (e.g., telemetrically) receive data indicative of state information (e.g., characteristic parameters) with respect to another device coupled with the network, such as the position of a valve 330 (e.g., open, closed, partially open with a percentage) connecting the fire apparatus storage 326 to an inlet side of a pump 328. For example, in fire ground applications, water is often pumped from a water storage 326 (e.g., storage tank) during the initial fire suppression operations, during which connections can be made between the pump 328 and one or more secondary sources. As an example, secondary sources may comprise a pool of water, such as a lake, a fire hydrant, and/or another fire truck.

Further, in this example, pressure governing operations can be used to mitigate fluid pressure and air entrainment related problems, which may be occur during a changeover process from the water source 326 to a secondary source. In one implementation, data indicative of device state information can be available on a common network 318, such as from a valve 330 on the water storage 326, and the governor can set the pump 328 at a desired speed (e.g., limited) during the operation, based at least upon a current and historical position of the water storage valve 330. In this implementation, for example, other discrete components 322 (e.g., fire suppression operation components, such as supply valve, manifold valves, nozzles, monitors, pumps, pressure discharge valves, in-line sensors, etc.) that are disposed on the communication network 318 may provide data indicative of state information that may facilitate determination of appropriate governor operation.

In another implementation, the pressure governor controller device can be configured to receive data indicative of control commands from one or more command devices 332, such as where a plurality of command control devices are coupled with the network 318, 336. Typically, a pressure governor is configured to merely accept control and pressure set points command inputs from a user. In one aspect, a pressure governor system can comprise an intelligent distributed network, for example, those that are associated with aerial control systems, networked valve systems and other integrated systems. As an example, some of these systems may utilize desired operating parameters, such as pump pressure and/or engine speed.

As an illustrative example, a pump operator can be tasked with monitoring separate systems on a fire apparatus, and with making appropriate adjustments, such as to the pump pressure and/or engine speed, based at least upon state information presented at the operator's panel, or to the operator through voice communication between personnel actively involved in the fire ground operations. In one implementation of the pressure governor device, intelligent control devices coupled with the system 318 can transmit control commands on the network 318, which may be received by the pressure governor controller 302, where the control commands can, at least, be based on state information identified during monitoring of the system or systems, for example, which may mitigate human interaction.

In one implementation, an operating characteristic of a fire suppression system may comprise pump pressure. In this implementation, sensor data from a pump intake pressure sensor 306 and a pump discharge pressure sensor 304 may provide data indicative of pump operations, such as fluid intake and outlet pressure, which may identify whether the pump is operating within desired parameters. Further, in this implementation, sensor data from a fluid level sensor in a water source 326 can provide data indicative of fluid source availability to the governor controller 302. Additionally, data indicative of engine and/or transmission operations 310 can be provided to the governor controller 302, such as from one or more sensors disposed in the engine/transmission systems 334. In this implementation, the state data provided by the respective sensors may be transmitted to the governor controller 302 using the communications network (e.g., the bus 318, and/or through wireless transmission 316).

In one aspect, U.S. fire safety standards require a newly produced fire apparatus to be tested by a third party. In this aspect, the testing called out by the standard is performed prior to delivery of the fire apparatus to the end customer. Currently, the test is defined by the National Fire Protection Agency document 1901—Chapter 16. Prior to delivery of a fire apparatus to the end user, the manufacturer can perform the tests described in the standard, on order to provide certification of ratings for a pump. In this aspect, the standard tests must be observed by a third party testing service in order to be certified. As an example, the standard's test can be performed a test facility, on-site at the manufacturer, commonly called a test pit. In this example, the test pit is configured to hold underground water storage tanks sufficient to supply water for the test as well as recover and cool the water discharged from the apparatus pump system. This is an extended test that can last several hours and may include the monitoring of a plurality of states of the pump operation and performance, which is performed in a controlled environment.

In one implementation, in this aspect, the controller 302 can be configured to report pump test information to a remote network 336 that is disposed remotely (e.g., in the cloud, on a remote server, to a communicatively coupled network device, etc.) to the fire apparatus. In this implementation, as one example, the pressure governor system can be placed in a desired compliance test mode of operation, such as by receiving a command from the network 318 or a discrete input (e.g., control input 212 in FIG. 2, such as from a test engineer input). In this operational mode, in this example, the pressure governor controller 302 may be communicatively coupled to a test system through either the control bus 318 and or a network-based service 320 (e.g., web-service). In this way, the resulting test points and pump performance data can be recorded by the governor, for example, and/or reported to a remote device, such as a computing tablet (e.g., or remote service appliance), such as through a gateway device connected to the engine control network 318.

In this aspect, an apparatus under test is often directly unmanned, for example, where a test technician may be located nearby in a shelter or pump-house disposed within the area of the testing facility. Further, in this aspect, the test technician can, as appropriate, monitor a state of one or more apparatuses under test and make any necessary adjustments or reconfigurations. In one implementation, in this aspect, when operating in testing mode, the governor system may be programmed and controlled by a remote computing device (e.g., wired or wirelessly as described above), such as under control of the test operator. In this way, for example, when operating under a third party test and certification mode, a test technician may be able to monitor and control (e.g., by transmitting commands over a coupled network) the governor system, along with any pump system testing parameters, from a remote location (e.g., away from the fire system under test).

In one aspect, a tactical command or safety officer may be located in another location (e.g., vehicle) away from the fire apparatus comprising the governor system, such as a command vehicle or modular command post. Such personnel are generally responsible for monitoring fire ground operations including personnel and equipment such as the fire apparatus. In one implementation, the pressure governor system (e.g., of FIG. 2) can be configured to transmit data (e.g., comprising state information) through a gateway 336 (e.g., a coupled network gateway device) to a remote server 320, such as a cloud-based server or other network-based server device/system. In one implementation, the gateway 336 may be disposed integral to the governor pressure controller system, and may be configured to communicate with a server 320 (e.g., or remote device, such as a mobile device) over wireless communications means 316 (e.g., or wired means). In another implementation, the pressure governor system may communicate through a network gateway 336 operably engaged with the vehicle control network 318.

In one implementation, the governor may receive (e.g., an/or store in local memory) state data regarding one or more portions of the fire apparatus, such as fluid storage level, pump discharge pressure, pump intake pressure, engine speed, pump engagement, interlock status and other various engine warning data. In this implementation, the pump state and control data that is made available to the pressure governor system may be transmitted to a remote device (e.g., cloud or network server) through network service (e.g., cloud service), such as representational state transfer (RESTful). In this way, for example, the received data may be made available to remote clients without interference of the operation of the pressure governor. As an example, a user that is connected to a remote server (e.g., web-based) may be able to access a plurality of data parameters pertinent to the pump and pump pressure governor in a location near or remote to the fire ground activity.

In one aspect, fire fighters regularly train on the operation of a piece of fire suppression equipment, such as a fire truck. In this aspect, some fire fighters may lack familiarity with the plurality of sub-systems available on a pump panel. In one implementation, in this aspect, the governor controller 302 can be placed into a training mode. In this mode of operation, for example, the governor controller 302 may be configured to limit the pressure to a desired limit (e.g., upper safety level), and response time for the purposes of training. In this implementation, the governor controller 302 may also be configured to replay input commands from a remotely connected computing device. In this way, the system can be used in situational training of various real-time pressure governor reactions, for example, to familiarize a fire fighter with expected governor reaction. Further, for example, by offering remote command, control and data relay, the system can provide a layer of safety during non-mission critical operations.

In one aspect, the pressure governor system can be configured to readily integrate with one or more other devices that are networked with the fire suppression device. That is, for example, one or more "smart devices" may be communicatively coupled with a network (e.g., a CAN) in the fire suppression device, and the pressure governor system may also be communicatively coupled to the network. In this example, a smart device may be configured to transmit and receive state information, and/or requests to and from the network. Further, in one implementation, the state data and/or requests may be received by another device, and/or the pressure governor system, and used to automatically update or modify one or more operational conditions in the fire suppression system. As an example, a smart valve may transmit the valve's position to the network, and the pressure governor may receive the state data and update a pump pressure setting to accommodate an expected amount of flow or a flow request.

In this way, in this aspect, the pressure governor system provides flexibility of being able to communicatively couple with interfaces that do not require human input, allowing the system to automatically update based on state conditions and/or demands of the system. Further, the pressure governor system may be configured to adapt to third party user interface device (UID), such as a tablet, laptop or other mobile input device or system mounted device. As an example, a valve controller display may be devised that is mounted (e.g., or portable) to a fire system (e.g., truck). Additionally, the pressure governor system can be extensible, for example, such that a plurality of control devices may be coupled with the network that communicates with the pressure governor system, thereby providing state information and/or requests to the governor from various aspects of the fire suppression system. Along with one or more command/control user interface devices that may be coupled to the pressure governor system, the extensible system can provide as much or as little state information and command/control functionality as a user of the system may desire.

Figure 4:
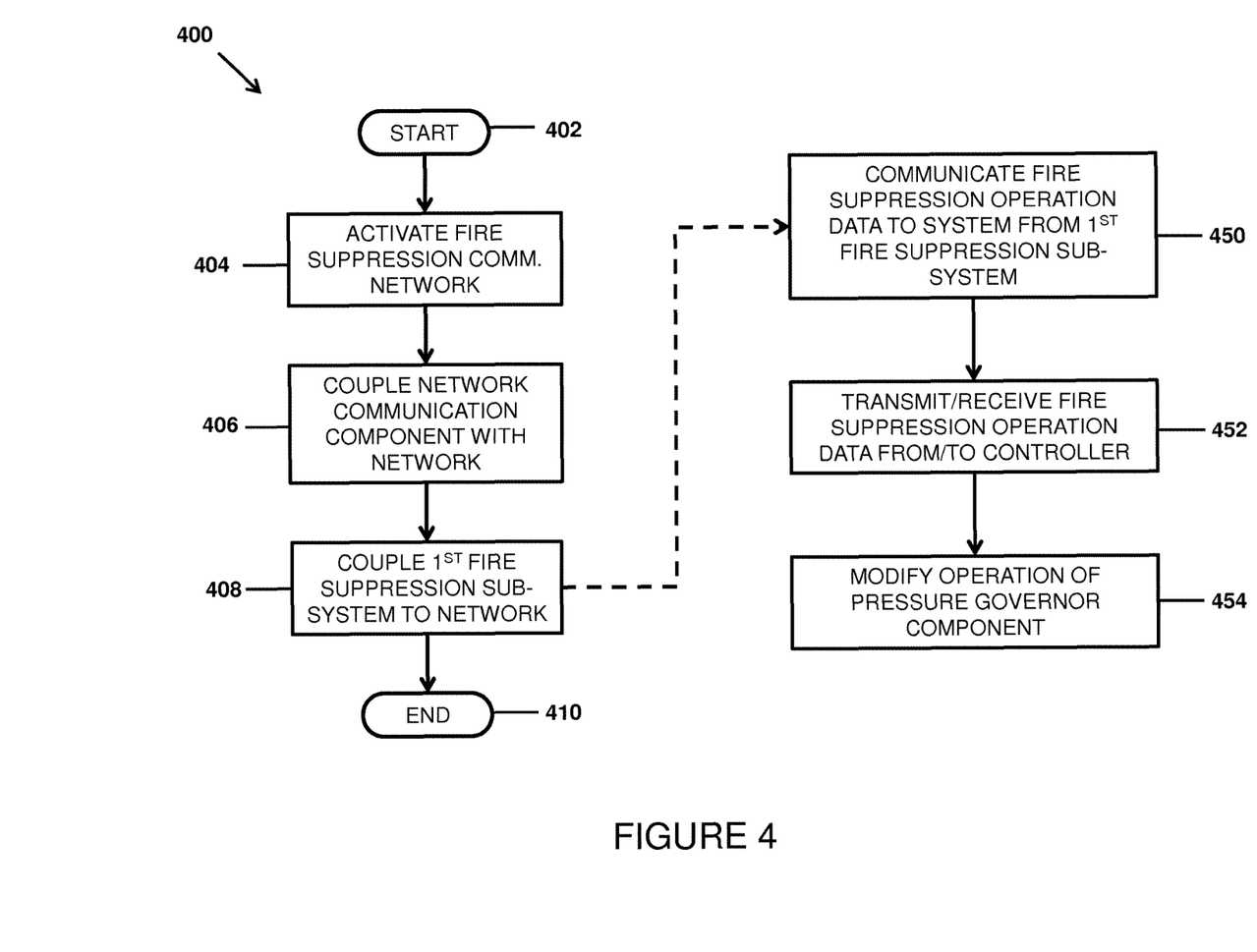
FIG. 4 is a flow diagram illustrating an exemplary method for a system for controlling fluid pressure in a fire suppression system.

In one aspect, a method for utilizing one or more portions of the one or more systems described herein may be devised. FIG. 4 is a flow diagram illustrating an exemplary method 400 for utilizing a distributed control network for a fire suppression system. The exemplary method 400 begins at 402. At 404, a fire suppression communication network can be activated. The fire suppression communication network can be configured to communicate fire suppression operation data to the system from at least a first fire suppression sub-system that is communicatively coupled with the network, and from a pressure governor controller communicatively coupled with the network. At 406, a network communication component can be communicatively coupled with the fire suppression communication network. In this implementation, the network communication component can be configured to transmit and receive fire suppression operation data. Further, the network communication component may be operably coupled with a pressure governor controller that is configured to modify an operation of a pressure governor component based at least upon the fire suppression operation data. Additionally, the pressure governor component can be configured to control a fluid flow output of a fluid pump coupled with the fire suppression system by controlling a power output of an engine coupled with the fluid pump.

In the exemplary method 400, at 408, the first fire suppression sub-system can be operably coupled with the fire suppression communication network. In one implementation, at 450, fire suppression operation data can be communicated from the first fire suppression sub-system to the network. Further, in this implementation, at 452, fire suppression operation data can be transmitted from the pressure governor controller to the network, and/or received by the pressure governor controller from the network. In one implementation, the fire suppression operation data can comprise data indicative of state information for the first fire suppression sub-system and/or controller, such as current conditions of the first fire suppression sub-system or pressure governor, and an operational request from the first fire suppression sub-system. In one implementation, the fire suppression operation data may comprise data indicative of an operational command from a command input device communicatively coupled to the network.

At 454, in one implementation, the operation of the pressure governor may be modified, which can modify a fluid flow output of a fluid pump coupled with the fire suppression system by controlling a power output of an engine coupled with the fluid pump. Having coupled the first fire suppression sub-system to the network, the exemplary method 400 ends at 410.

In one implementation, at 408, a second fire suppression operation component can be operably coupled to the communication network, where the second fire suppression operation component may be configured to perform a second fire suppression operation, and the second suppression operation component can comprise a second control component communicatively coupled with the network. In this implementation, the second control component may be configured to identify a state of the second fire suppression operation component, at 458. Additionally, the second control component may be configured to provide data indicative of the state of the second fire suppression operation component to the network, at 460. The second control component can also be configured to access data indicative of a state of first fire suppression operation component from the network, at 462, and modify the state of the second fire suppression operation based at least upon an indication from the data accessed from the network, at 464.

In this implementation, having operably coupled the second fire suppression operation component to the communication network, the exemplary method 400 ends at 410.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more embodiments. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising." Various operations of implementations are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

What is claimed is:

1. A system for controlling fluid pressure in a fire suppression system, comprising:
   a fire suppression communication network communicatively coupled with a first fire suppression sub-system to transmit fire suppression operation data from the first fire suppression sub-system, the fire suppression operation data comprising one or more of:
      data indicative of state information for the first fire suppression sub-system, the state information comprising of one or more of:
         a current conditions of the first fire suppression sub-system; and
         an operational request from the first fire suppression sub-system; and
      data indicative of an operational command from a command input device communicatively coupled to the fire suppression communication network;
   a network communication component communicatively coupled with the fire suppression communication network, the network communication component receiving the fire suppression operation data from the first fire suppression sub-system transmitted by the network;
   a pressure governor controller operably coupled with the network communication component, to modify an operation of a pressure governor based at least upon the fire suppression operation data; and
   the pressure governor operably coupled with the pressure governor controller to control a power output of an engine coupled to the pressure governor, resulting in controlling of a fluid flow output of a fluid pump coupled with the engine based at least upon the fire suppression operation data.

2. The system of claim 1, the pressure governor responsive to one or more output controls from the pressure governor controller.

3. The system of claim 1, the pressure governor controller receiving input from the pressure governor indicative of a state of the pressure governor.

4. The system of claim 1, the network communication component comprising one or more of:
   a wireless network communication interface, communicating with the fire suppression communication network wirelessly; and
   a wired network communication interface, communicating with the fire suppression communication network through a fire suppression system communication and control bus.

5. The system of claim 1, the fire suppression communication network comprising a fire vehicle communication and control bus network.

6. The system of claim 1, fire suppression operation data indicative of one or more of:
   fluid pump fluid discharge pressure;
   fluid pump fluid intake pressure;
   fluid storage fluid level; and
   state information for one or more interlocks.

7. The system of claim 1, the pressure governor controller receiving one or more control inputs, respectively indicative of a user desired operational condition.

8. The system of claim 7, the pressure governor controller modifying the operation of the pressure governor based at least upon the one or more control inputs, in conjunction with the fire suppression operation data and a state of the pressure governor.

9. The system of claim 1, comprising a first network device control interface operably coupled with the fire suppression communication network to provide control inputs to the pressure governor.

10. The system of claim 9, comprising a second network device control interface operably coupled with the fire suppression communication network to provide control inputs to the pressure governor controller in a master-slave arrangement with the first network device control interface.

11. The system of claim 1, the network communication component communicating with a remote network to receive operational settings from the remote network and transmit state data to the remote network.

12. The system of claim 1, the network communication component automatically communicating with the first fire suppression sub-system when coupled with the fire suppression communication network.

13. A device for controlling fluid pressure in a fire suppression system, comprising:
 a network communication component communicatively coupled with a fire suppression communication network to transmit pressure governor state data to the fire suppression communication network, and to receive fire system state data and data indicative of an operational request from the fire suppression communication network, the network communication component communicatively coupled with a plurality of fire suppression sub-systems in the fire suppression system through the fire suppression communication network, the received fire system state data comprising a current condition of a fire suppression sub-system coupled with the communication network; and
 data indicative of an operational request comprising one of:
  an operational request from one of the plurality of fire suppression sub-systems; and
  and operational command from a command input device communicatively coupled to the fire suppression communication network;
 a pressure governor controller operably coupled with a pressure governor to control a power output of an engine coupled to the pressure governor, resulting in controlling of a fluid flow output of a fluid pump coupled with the engine, the pressure governor controller utilizing one or more of the received fire system state data and the received operational request to modify fluid flow of the fluid pump by modifying the power output of the engine.

14. The device of claim 13, the network communication component comprising one or more of:
 a wireless network communication interface to communicate with the communication network wirelessly; and
 a wired network communication interface to communicate with the communication network through a fire suppression system communication and control bus.

15. The device of claim 13, the network communication component configured to communicate with a remote network to receive operational settings from the remote network and transmit state data to the remote network.

16. The device of claim 13, the network communication component configured to automatically communicate with the respective fire suppression sub-systems when coupled with the fire suppression communication network.

17. A method for controlling fluid pressure in a fire suppression system, comprising:
 operating a fire suppression system's pressure governor to control a power output of an engine coupled to the pressure governor, resulting in controlling of a fluid flow output of a fluid pump coupled with the engine, the operating of the pressure governor comprising:
  operably coupling a first fire suppression sub-system to a fire suppression communication network, where the fire suppression operation data comprises one or more of:
   data indicative of state information for the first fire suppression sub-system, the state information comprising of one or more of:
    a current conditions of the first fire suppression sub-system; and
    an operational request from the first fire suppression sub-system; and
   data indicative of an operational command from a command input device communicatively coupled to the network
  activating the fire suppression communication network to communicate fire suppression operation data to the fire suppression system from at least the first fire suppression sub-system that is communicatively coupled with the fire suppression communication network; and
 operably coupling a network communication component with the fire suppression communication network, the network communication component transmitting and receiving the fire suppression operation data, the network communication component operably coupled with a pressure governor controller that modifies operation of the pressure governor based at least upon the fire suppression operation data.

* * * * *